(No Model.) 2 Sheets—Sheet 2.

P. DAVIES.
ELASTIC TIRE.

No. 486,542. Patented Nov. 22, 1892.

Witnesses.
B. W. Miller
C. F. Sensiner

Inventor.
Preston Davies,
By his Attorneys,
Baldwin Davidson Wight.

THE NORRIS PETERS CO., PHOTO-LITHO., WASHINGTON, D. C.

UNITED STATES PATENT OFFICE.

PRESTON DAVIES, OF LONDON, ENGLAND.

ELASTIC TIRE.

SPECIFICATION forming part of Letters Patent No. 486,542, dated November 22, 1892.

Application filed March 25, 1892. Serial No. 426,386. (No model.)

*To all whom it may concern:*

Be it known that I, PRESTON DAVIES, a subject of the Queen of Great Britain, residing at No. 12, Kempson Road, Walham Green, Fulham, London, in the county of Middlesex and Kingdom of England, have invented certain new and useful Improvements in and Relating to Elastic Tires and in Means for Securing the Same to the Rims of Wheels, of which the following is a specification.

My invention relates to that class of wheel-tires which are formed hollow and inflated with air or filled with other fluid.

Heretofore tires such as those now commonly known as "pneumatic" tires have been found to be unreliable in use by reason of their liability to puncture, and it has then been found expensive and laborious to repair them, owing to the difficulty in reaching the inner or inflated tube and removing it for testing and replacing the same after repair or substituting a new one for it.

The objects of my improvements are, first, to obtain increased strength in the tire; second, to provide means for securing the tire to the rim of the wheel without sewing or solution, thereby enabling the internal or inflated tube to be exposed to view for the purposes of examination, repair, removal, or renewal with ease and quickness without the necessity of unsolutioning or unsewing the outer substances, and, third, to provide means for preventing damage to the inflated tube of the tire by the chafing of the edges of the metallic rim of the wheel.

The annexed drawings, which are made to a sufficiently-enlarged scale to admit of the parts being clearly shown, illustrate my improvements.

Figure 1:
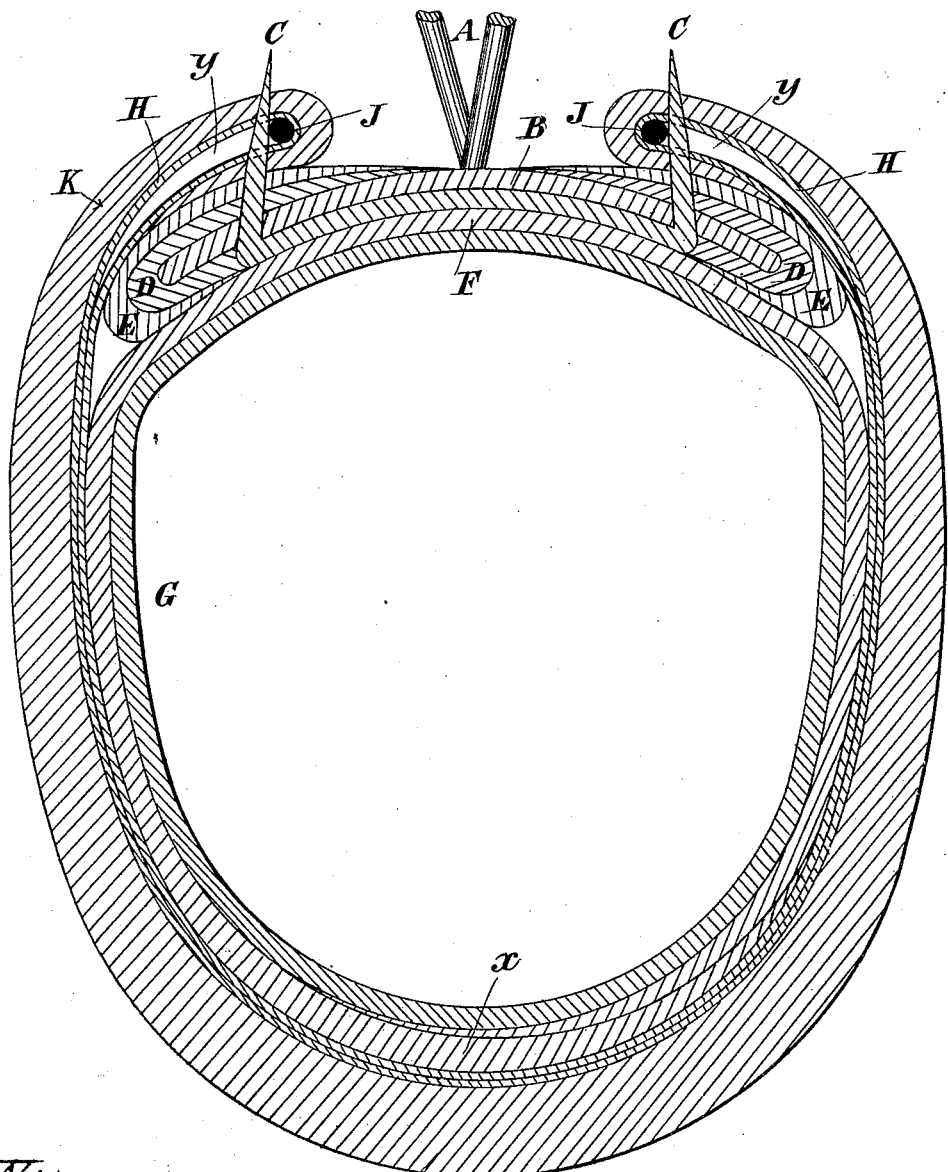
Figure 2:
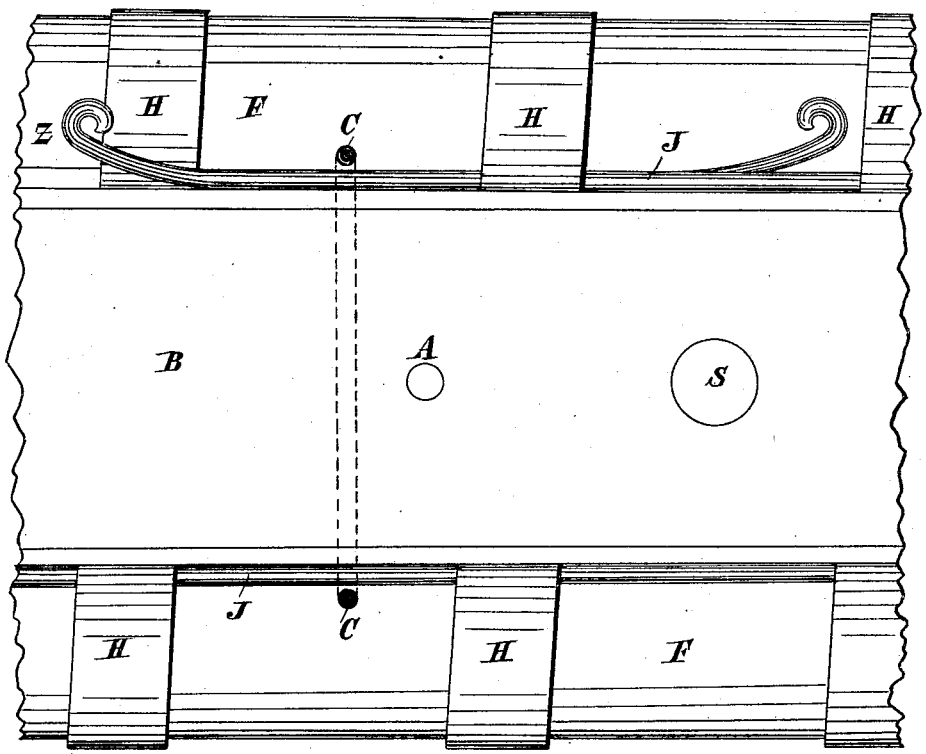

Figure 1 is a cross-section of a tire and rim of a wheel made according to my invention. Fig. 2 is a plan of portion of the convex side of the rim of the wheel with the outer rubber covering K and some of the spirals (hereinafter referred to) of the band H removed to show the wires J.

Similar letters refer to similar parts throughout the several views.

Referring to Fig. 1, I construct a wheel with metallic spokes A and crescent-shaped rim B. Hooks C, preferably made in one piece, as shown in the drawings, pass through the rim and project toward the hub of the wheel at intervals around it, for the purpose hereinafter mentioned. To the rim B a leather D, known as "white half-strained sheep-skin," or other suitable material, is affixed by solutioning or other suitable means. The edges of the rim are next covered with sheet india-rubber or other suitable material E. Along the center line of the concave side of the rim I attach by solutioning or other suitable means a strip or band of white half-strained sheep-skin or other suitable material F, which is of a width sufficient to admit of its being wrapped around the tube next hereinafter mentioned, so that when the latter is inflated or filled the former will overlap, as shown at *x*.

G is the bladder or internal tube, made of india-rubber or other suitable material in the well-known way, being joined together so as to form a complete ring and having a smaller tube (composed of india-rubber or of india-rubber and canvas combined or other similar materials) coming from it at a point in its circumference, which is carried up through an opening *s* (see Fig. 2) in the rim B to receive a suitable valve for the purpose of charging it. To limit the expansion of the tube G under pressure of inflation or filling and to keep the same in position on the rim of the wheel, I employ a band H. This band is formed of a continuous length of tape, webbing, ribbon, or other suitable material wound round in a close spiral, so that each succeeding turn overlaps the preceding one. The way in which I generally prefer to construct this band is as follows: I take a continuous length of tape, webbing, ribbon, or other suitable material and wind it in a close flattened spiral form over two rigid metallic bands held parallel to and the requisite distance apart from each other. I so proceed till a band of sufficient length is built up. Parallel to and a short distance from the edges of the completed band a stitching is run, thereby securing the spiral windings in position and forming loops *y*, through which after removal of the rigid metallic bands wires J are passed, after which a second stitching is run nearer each edge to secure the wires in position at each of the extreme edges of the band. The completed band is then joined together at its ends, so as to form a ring, the wires J being free to move within the loops and having their ends free, as shown in Fig. 2. In some cases—for instance, in wheels of large diameter—I may, instead of having one wire forming a completed circle at each edge of the band, divide such wires into semicircular or other sectional parts, in which case each of the ends of each section of wire is made to overlap, as shown at z. (See Fig. 2.) When this is done, it enables the size of the circle to be varied more easily, which is an advantage when the tire is being inflated or deflated. On the outside of the band H a band of india-rubber or other suitable material K, preferably formed thicker at the tread of the wheel, as shown at r, is firmly attached by solutioning or other suitable means. This band K is of sufficient width to form a complete outer covering and to encircle the wires at the edges of the band H. A combined final covering or "jacket" is thus formed by the materials H and K. This is affixed to the rim of the wheel by passing it over the hooks C, the wires J at the same time being caught over such hooks and encircling the under side of the rim of the wheel. The tube G is then inflated or filled through the valve, and as it expands the whole tire is filled out. The circles, semicircles, or other sections of wires J being free to move within the loops can expand in diameter as expansion proceeds and are drawn down and so made to bed in the covering E on the rim of the wheel, whereby dust or wet is prevented from reaching the internal portions of the tire. It will be seen that the tube G can be easily reached for the purposes of examination, repair, or renewal, and removed or replaced in the form of a ring without cutting and joining. It is only necessary to deflate the tube, then slightly diminish the circumference of the wires J on one side of the wheel by easing the overlapping portions, as shown at z, (see Fig. 2,) and unhook the same, with their attachments, from the hooks C, thereby enabling the jacket to be turned back or inside out.

Having fully described my invention, what I claim, and desire to secure by Letters Patent, is—

1. The combination, in a wheel-tire, of an inflated tube G with a protective wrapping F, secured to the rim B, and an outer removable combined covering or jacket built up of spiral windings of tape, webbing, ribbon, or other suitable material H on its inner side and india-rubber K on its outer side, held in position on the under side of the rim of the wheel by wires J and hooks C, all substantially as set forth.

2. The combination, with a wheel-rim B, provided with coverings of leather D, india-rubber E, and jacket H, of hooks C, each formed in one piece, passing through the rim, but not otherwise secured thereto, and also passing through the coverings of leather and india-rubber and serving to secure the jacket to the rim, substantially as set forth.

In testimony whereof I have hereunto subscribed my name this 14th day of March, A. D. 1892.

PRESTON DAVIES.

Witnesses:
CHARLES EVERETT,
ARTHUR F. SPOONER.